US009279973B2

(12) United States Patent
Takaya

(10) Patent No.: US 9,279,973 B2
(45) Date of Patent: Mar. 8, 2016

(54) IMAGE PROCESSING APPARATUS, FLUORESCENCE MICROSCOPE APPARATUS, AND IMAGE PROCESSING PROGRAM

(75) Inventor: Motohito Takaya, Hino (JP)

(73) Assignee: OLYMPUS CORPORATION, Tokyo (JP)

( * ) Notice: Subject to any disclaimer, the term of this patent is extended or adjusted under 35 U.S.C. 154(b) by 565 days.

(21) Appl. No.: 13/610,006

(22) Filed: Sep. 11, 2012

(65) Prior Publication Data

US 2013/0070054 A1      Mar. 21, 2013

(30) Foreign Application Priority Data

Sep. 20, 2011 (JP) .................................. 2011-204903

(51) Int. Cl.
*G02B 21/00* (2006.01)
*H04N 13/00* (2006.01)

(52) U.S. Cl.
CPC .......... *G02B 21/0076* (2013.01); *G02B 21/008* (2013.01)

(58) Field of Classification Search
CPC ...... A61B 5/0068; G06T 5/50; G02B 21/002; G02B 21/082; G01B 9/04; H04N 5/23229; H04N 5/235; H04N 13/0239
USPC ........... 348/46, 79, 221.1, 254; 382/254, 133, 382/128
See application file for complete search history.

(56) References Cited

U.S. PATENT DOCUMENTS 6,225,636 B1 *   5/2001   Ginestet ..................... 250/458.1
7,009,700 B2 *   3/2006   Dubois et al. ................ 356/317
7,187,494 B2 *   3/2007   Nishiwaki et al. ............ 359/388

(Continued)

FOREIGN PATENT DOCUMENTS

CN       101710131 B   *   6/2011
JP        11-183803 A         7/1999

(Continued)

OTHER PUBLICATIONS

Extended European Search Report (EESR) dated Jan. 7, 2014 (in English) in counterpart European Application No. 12006571.9.

*Primary Examiner* — Christopher S Kelley
*Assistant Examiner* — Kathleen Walsh
(74) *Attorney, Agent, or Firm* — Holtz, Holtz & Volek PC

(57) ABSTRACT

A three-dimensional image without luminance irregularity is generated while achieving good contrast. An image processing apparatus is provided, including an image combining portion that generates combined images by combining, for each depth position in a specimen, a plurality of fluorescence images captured with differing exposure levels at each of different depth positions of the specimen; a smoothed-luminance calculating portion that calculates a representative luminance from the individual combined images and that calculates a smoothed luminance for the individual combined images by smoothing the calculated representative luminance in the depth direction; a luminance correcting portion that generates corrected images by correcting the luminance of the individual combined images on the basis of differences between the smoothed luminance and the representative luminance calculated; and a three-dimensional image generating portion that generates a three-dimensional image of the specimen from the plurality of corrected images.

8 Claims, 8 Drawing Sheets

(56) References Cited

U.S. PATENT DOCUMENTS

| | | | |
|---|---|---|---|
| 7,196,339 B2 * | 3/2007 | Namba et al. | 250/458.1 |
| 7,564,621 B2 * | 7/2009 | Kawano et al. | 359/383 |
| 7,630,538 B2 * | 12/2009 | Nishiyama et al. | 382/154 |
| 7,724,937 B2 * | 5/2010 | So et al. | 382/133 |
| 7,932,504 B2 * | 4/2011 | Yamada | 250/461.2 |
| 8,031,237 B2 * | 10/2011 | Kirisawa | 348/228.1 |
| 8,078,265 B2 * | 12/2011 | Mahmood et al. | 600/476 |
| 8,570,401 B2 * | 10/2013 | Manabe | 348/234 |
| 2004/0238731 A1 * | 12/2004 | Nishiyama et al. | 250/234 |
| 2005/0036667 A1 * | 2/2005 | So et al. | 382/128 |
| 2005/0122577 A1 * | 6/2005 | Fujimoto et al. | 359/383 |
| 2005/0153356 A1 * | 7/2005 | Okawa et al. | 435/6 |
| 2005/0213204 A1 * | 9/2005 | Kei | 359/383 |
| 2005/0270639 A1 * | 12/2005 | Miki | 359/381 |
| 2006/0109546 A1 * | 5/2006 | Namba et al. | 359/385 |
| 2006/0262363 A1 * | 11/2006 | Henley | 358/516 |
| 2008/0074649 A1 * | 3/2008 | Levenson et al. | 356/73 |
| 2009/0173898 A1 * | 7/2009 | Kitahara et al. | 250/578.1 |
| 2009/0238435 A1 * | 9/2009 | Shields | 382/133 |
| 2010/0182417 A1 * | 7/2010 | Takagi et al. | 348/79 |
| 2010/0290714 A1 * | 11/2010 | Toyoda et al. | 382/264 |
| 2011/0025880 A1 * | 2/2011 | Nandy | 348/226.1 |
| 2011/0228993 A1 * | 9/2011 | Reilly et al. | 382/128 |
| 2012/0008015 A1 * | 1/2012 | Manabe | 348/234 |
| 2012/0200694 A1 * | 8/2012 | Garsha et al. | 348/79 |

FOREIGN PATENT DOCUMENTS

| | | | |
|---|---|---|---|
| JP | 11183803 A * | 7/1999 | |
| JP | 2006345509 A * | 12/2006 | |
| JP | 2007-041120 A | 2/2007 | |
| JP | 2007041120 A * | 2/2007 | |
| JP | 2008-170973 A | 7/2008 | |
| JP | 2008170973 A * | 7/2008 | |
| JP | 2009033293 A * | 2/2009 | |
| WO | WO 2010/143375 A1 | 12/2010 | |
| WO | WO 2010143375 A1 * | 12/2010 | |

* cited by examiner

IMAGE PROCESSING APPARATUS, FLUORESCENCE MICROSCOPE APPARATUS, AND IMAGE PROCESSING PROGRAM

CROSS-REFERENCE TO RELATED APPLICATIONS

This application is based on Japanese Patent Application No. 2011-204903, the contents of which is incorporated herein by reference.

TECHNICAL FIELD

The present invention relates to an image processing apparatus, a fluorescence microscope apparatus, and an image processing program.

BACKGROUND ART

With confocal microscope apparatuses in the related art that generate three-dimensional images from a plurality of image slices, there is a known technology in which the dynamic range of the image slices is expanded by performing analog-to-digital conversion (AD conversion) of signals output from a camera after adjusting the signal levels so as to fall within a predetermined range by means of an automatic gain control (AGC) circuit (for example, see Patent Literature 1). With such a technology, image slices having good contrast can be obtained.

CITATION LIST

Patent Literature

{PTL 1} Japanese Unexamined Patent Application, Publication No. Hei 11-183803

SUMMARY OF INVENTION

Technical Problem

In the case of Patent Literature 1, signal gain applied by the AGC circuit differs for each image slice. For example, an image slice containing a region of strong fluorescence emission is processed with a low gain, whereas an image slice that is dark overall is processed with a high gain. Therefore, regions having the same brightness in reality are expressed with different luminance values in each of the individual image slices. A stripe-patterned luminance irregularity occurs in a three-dimensional image generated from such image slices in accordance with the variability in luminance values among the image slices.

The present invention aims to provide an image processing apparatus, a fluorescence microscope apparatus, and an image processing program which make it possible to generate a three-dimensional image without luminance irregularity while achieving good contrast.

Solution to Problem

A first aspect of the present invention is an image processing apparatus including an image combining portion that generates combined images by combining, for each depth position in a specimen, a plurality of fluorescence images captured with differing exposure levels at each depth position, which are fluorescence images generated by capturing fluorescence coming from the specimen at different depth positions in the specimen; a smoothed-luminance calculating portion that calculates a representative luminance from the individual combined images generated by the image combining portion and that calculates a smoothed luminance for the individual combined images by smoothing the calculated representative luminance in the depth direction; a luminance correcting portion that generates corrected images by correcting the luminance of the individual combined images on the basis of differences between the smoothed luminance and the representative luminance calculated by the smoothed-luminance calculating portion; and a three-dimensional image generating portion that generates a three-dimensional image of the specimen from the plurality of corrected images generated by the luminance correcting portion.

A second aspect of the present invention is a fluorescence microscope apparatus including a light source that radiates excitation light onto a specimen; an objective optical system that collects fluorescence generated at the specimen due to the irradiation with the excitation light; an image capturing portion that captures the fluorescence collected by the objective optical system; a focal-position controller that causes the image capturing portion to capture images of the specimen at a plurality of focal positions by moving the focal position of the objective optical system in the optical axis direction of the objective optical system; an exposure-level controller that causes the image capturing portion to capture the fluorescence multiple times at the individual focal positions with differing exposure levels; an image combining portion that generates combined images by combining the plurality of fluorescence images acquired by the image capturing portion at each focal position in accordance with the control by the focal-position controller and the exposure-level controller; a smoothed-luminance calculating portion that calculates a representative luminance from the individual combined images generated by the image combining portion and that calculates a smoothed luminance for the individual combined images by smoothing the calculated representative luminance in the optical axis direction; a luminance correcting portion that generates corrected images by correcting the luminance of the individual combined images on the basis of differences between the smoothed luminance and the representative luminance calculated by the smoothed-luminance calculating portion; and a three-dimensional image generating portion that generates a three-dimensional image of the specimen from the plurality of corrected images generated by the luminance correcting portion.

A third aspect of the present invention is an image processing program that causes a computer to execute a step of generating combined images by combining, for each depth position in a specimen, a plurality of fluorescence images captured with differing exposure levels at each depth position, which are fluorescence images generated by capturing fluorescence coming from the specimen at different depth positions in the specimen; a step of calculating an average luminance from the individual generated combined images and of calculating a smoothed luminance for the individual combined images by smoothing the calculated average luminance in the depth direction; a step of generating corrected images by correcting the luminance of the individual combined images on the basis of differences between the calculated smoothed luminance and the average luminance; and a step of generating a three-dimensional image of the specimen from the plurality of generated corrected images.

Advantageous Effects of Invention

With the present invention, an advantage is afforded in that it is possible to generate a three-dimensional image without luminance irregularity while achieving good contrast.

DESCRIPTION OF EMBODIMENT

A fluorescence microscope apparatus 1 according to an embodiment of the present invention will be described below with reference to the drawings.

Figure 1:
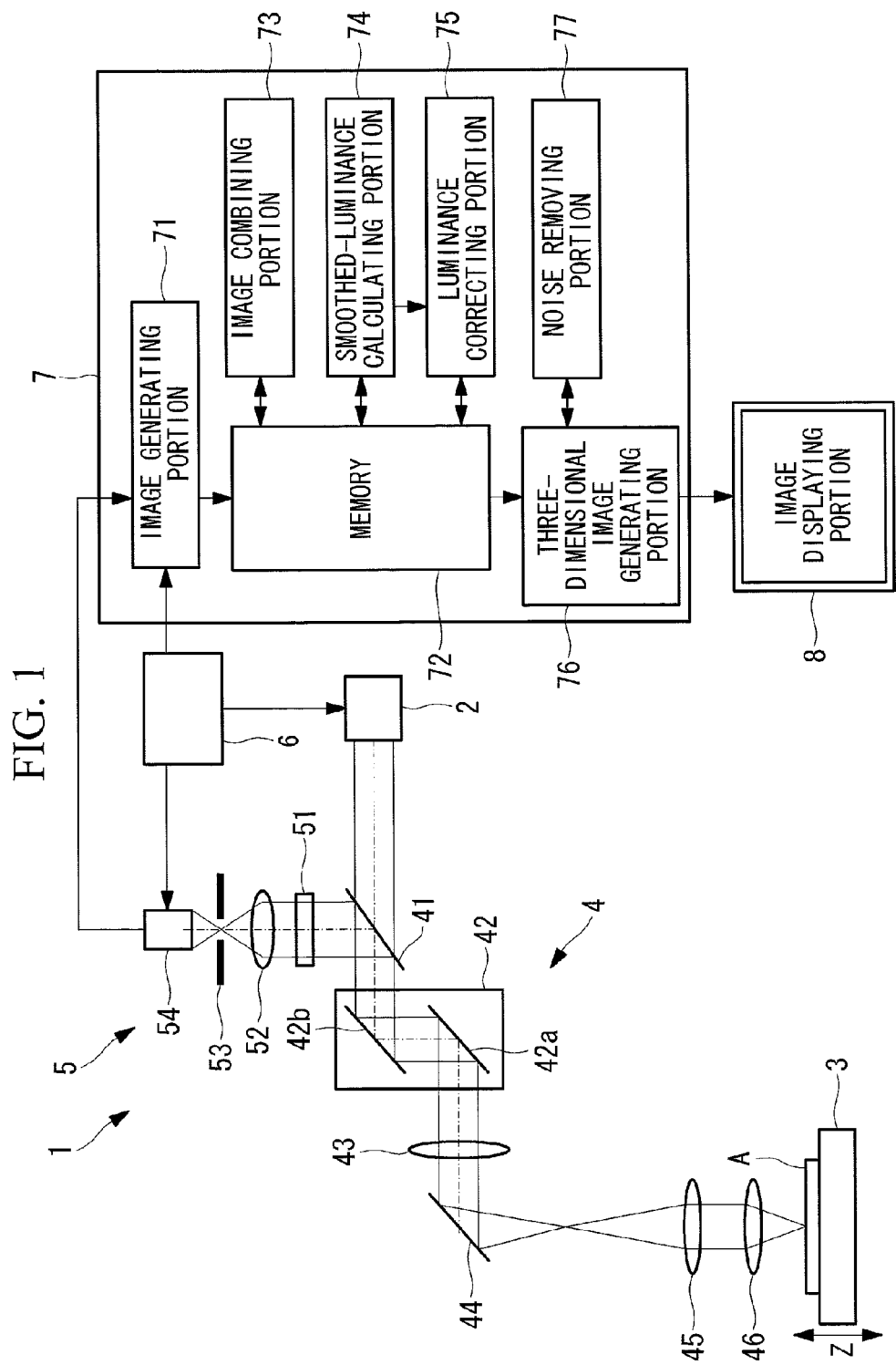
FIG. 1 is an overall configuration diagram of an image processing apparatus and a fluorescence microscope apparatus according to an embodiment of the present invention.

The fluorescence microscope apparatus 1 according to this embodiment is configured based on a laser-scanning microscope. As shown in FIG. 1, the fluorescence microscope apparatus 1 is provided with, as main components, a laser light source (light source) 2 that radiates laser light, a stage 3 on which a specimen A is placed, a irradiation optical system 4 that radiates the laser light from the laser light source 2 onto the specimen A, a detection optical system 5 that detects fluorescence coming from the specimen A, a control unit (focal-position controller and exposure-level controller) 6 that controls positions and exposure levels of the fluorescence detected by the detection optical system 5, an image processing unit 7 that forms an image from the fluorescence detected by the detection optical system 5, and an image displaying portion 8 that displays an image generated by the image processing unit 7.

The specimen A is, for example, a group of cells. A fluorescent substance that specifically binds to cells serving as an observation subject included in the group of cells or that is expressed therein is administered to the group of cells.

The laser light source 2 emits laser light (excitation light) having an excitation wavelength that excites the fluorescent substance in the specimen A. The output intensity of the laser light is controlled by the control unit 6, as described later.

The stage 3 is provided so as to be movable in an optical-axis direction (Z-direction) of an objective lens 46, described later, and in the two axial directions (XY-directions) that intersect with the optical axis in accordance with control signals from the control unit 6.

The irradiation optical system 4 is an optical system that radiates laser light from the laser light source 2 onto the specimen A. The irradiation optical system 4 is provided with a dichroic mirror 41, a scanning optical unit 42, a relay lens 43, a mirror 44, an imaging lens 45, and the objective lens (objective optical system) 46.

The objective lens 46 is placed facing the stage 3. The objective lens 46 radiates the laser light emitted from the laser light source 2 onto the specimen A on the stage 3 and, also, collects light coming from the specimen A and including fluorescence excited by the laser light.

The dichroic mirror 41 allows the laser light from the laser light source 2 to pass therethrough and, while reflecting the fluorescence coming from the specimen A collected by the objective lens 46 toward a photodetector 54, described later.

The scanning optical unit 42 has a pair of galvanometer mirrors 42a and 42b, and changes the swing angles of these galvanometer mirrors 42a and 42b so as to be driven by a raster scanning method. Accordingly, the scanning optical unit 42 scans the laser light from the laser light source 2 on the specimen A in the two axial directions (XY-directions) orthogonal to the optical axis of the objective lens 46.

The detection optical system 5 is an optical system that detects the fluorescence coming from the specimen A. The detection optical system 5 is provided with a photometric filter unit 51, a lens 52, a pinhole 53, and the photodetector (image capturing portion) 54.

In the light coming from the specimen A and reflected by the dichroic mirror 41, the photometric filter unit 51 allows fluorescence to pass therethrough and blocks light other than the fluorescence (for example, the laser light from the laser light source 2).

The lens 52 focuses the fluorescence coming from the specimen A, which has passed through the photometric filter unit 51, onto the pinhole 53.

The pinhole 53 is configured so as to allow only the fluorescence generated at a focal position of the laser light at the specimen A to pass therethrough. Specifically, by passing through the pinhole 53, light coming from positions shifted in the Z-direction from the focal position (measurement point) of the laser light is removed from the fluorescence collected by the objective lens 46. Accordingly, only the fluorescence coming from the same plane as the focal position in the Z-direction enters the photodetector 54.

The photodetector 54 is, for example, a photomultiplier tube. The photodetector 54 photoelectrically converts the detected fluorescence coming from the specimen A and outputs the obtained electric signal to an image generating portion 71 (described later) of the image processing unit 7.

The control unit 6 causes the laser light source 2, the stage 3, the scanning optical unit 42, and the photodetector 54 to be operated synchronously. Specifically, the control unit 6 moves the focal position of the fluorescence detected by the photodetector 54 in the Z-direction by moving the stage 3 in the Z-direction by a predetermined distance interval. Furthermore, by increasing or decreasing at least one of the detection sensitivity of the photodetector 54, the exposure time of the photodetector 54, and the output intensity of the laser light from the laser light source 2 in a stepwise manner at the individual focal positions, the control unit 6 changes the exposure level of the fluorescence detected by the photodetector 54 in a stepwise manner. Accordingly, the image generating portion 71, described later, generates a plurality of fluorescence images with differing fluorescence exposure levels at the plurality of focal positions.

The image processing unit 7 is provided with the image generating portion 71, a memory 72, an image combining portion 73, a smoothed-luminance calculating portion 74, a luminance correcting portion 75, a three-dimensional image generating portion 76, and a noise removing portion 77.

The image generating portion 71 generates a fluorescence image of the specimen A by associating intensities of the fluorescence coming from the specimen A and detected by the photodetector 54 with scanning positions in the XY-directions of the laser light on the specimen A scanned by the scanning optical unit 42. At this time, the image generating portion 71 generates a plurality of fluorescence images with differing fluorescence exposure levels at the plurality of focal positions based on the exposure-level control by the control unit 6. The image generating portion 71 stores the generated fluorescence images in the memory 72 in association with the positions of the stage 3 in the Z-direction at the time of acquiring those fluorescence images.

The image combining portion 73 generates a combined image by combining the plurality of fluorescence images with different exposure levels, having the same Z-direction position. Specifically, in a fluorescence image having a large light reception level, low-luminance regions in cells serving as observation subjects are clearly displayed, whereas the luminance becomes saturated in high-luminance regions in the cells. In a fluorescence image having a low light reception level, on the other hand, the low-luminance regions of the cells becomes unclear due to a heavy noise interference, whereas the high-luminance regions of the cells are clearly displayed. By combining regions in the individual fluorescence images captured at appropriate exposure levels in this way, the image combining portion 73 generates a combined image having an apparently greater dynamic range than the dynamic ranges of the original fluorescence images. The image combining portion 73 stores a plurality of the generated combined images in the memory 72.

Figure 2A:
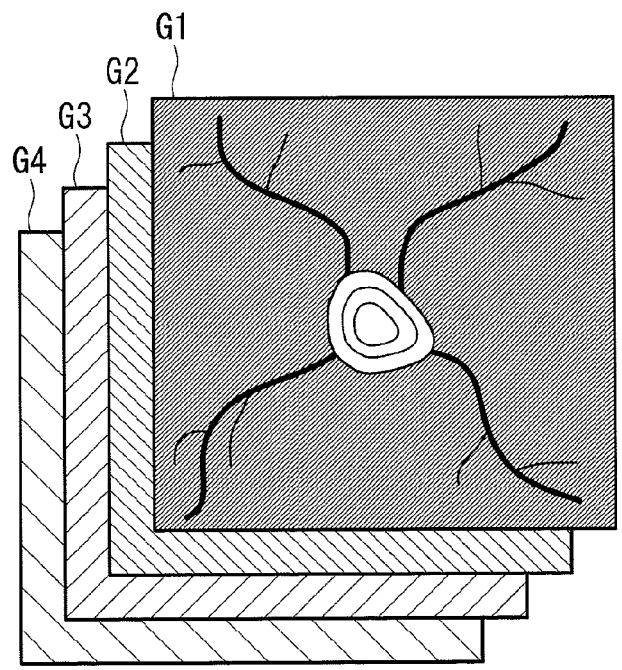
FIG. 2A is a diagram schematically showing combined images generated by an image combining portion.

Here, the widths of the dynamic ranges of the individual combined images, expanded relative to those of the fluorescence images, differ depending on the ranges of luminance distributions in the plurality of original fluorescence images. Accordingly, regions having the same brightness in reality are expressed with a different luminance in each of combined images G1 to G4, as shown in FIG. 2A.

The smoothed-luminance calculating portion 74 acquires the plurality of combined images stored in the memory 72, and calculates a representative luminance for the individual combined images. It is preferable that the average luminance of the individual combined images be used as the representative luminance. The case in which the average luminance of the individual combined images is used as the representative luminance will be described below. However, for example, the maximum luminance of the individual combined images may be used as the representative luminance instead of the average luminance.

Figure 3:
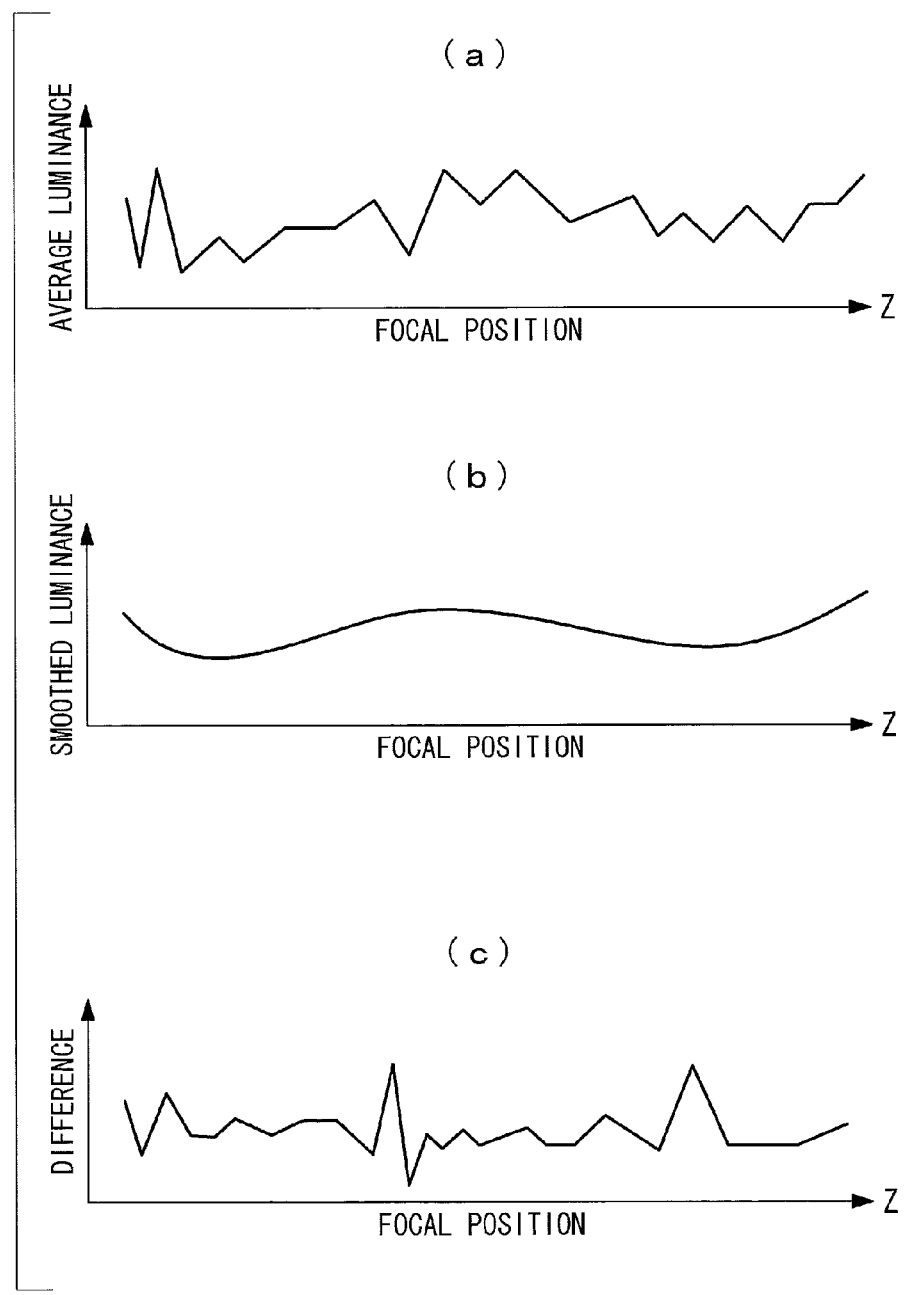
FIG. 3 shows graphs showing fluctuations in the Z-direction in (a) the average luminance of combined images, (b) the smoothed luminance obtained by smoothing the average luminance, and (c) the difference between the average luminance and the smoothed luminance.

As shown in (a) of FIG. 3, the average luminance calculated by the smoothed-luminance calculating portion 74 discontinuously changes in the Z-direction due to the variability in the widths of the dynamic ranges of the combined images as described above. Next, as shown in (b) of FIG. 3, the smoothed-luminance calculating portion 74 performs smoothing of the average luminance in the Z-direction so as to remove comparatively fine fluctuations in the average luminance while preserving comparatively large fluctuations in the average luminance, thereby calculating smoothed luminance for the individual combined images. The smoothed-luminance calculating portion 74 outputs the calculated smoothed luminance of the individual combined images to the luminance correcting portion 75. Note that, in (a) and (b) of FIG. 3, the lateral axis indicates positions of the combined images in the Z-direction and the vertical axis indicates the average luminance.

For smoothing processing, for example, a moving average filter is used. A moving average filter calculates an average of average luminances of a predetermined number of combined images that are continuous in the Z-direction centered around a combined image of interest, and sets the calculated average of the average luminance to the luminances of the combined image of interest.

The luminance correcting portion 75 calculates the differences between the smoothed luminance and average luminance calculated by the smoothed-luminance calculating portion 74 for the individual combined images, and generates corrected images by correcting the luminances of the combined images based on the calculated differences. Specifically, the luminance correcting portion 75 calculates ratios of the calculated differences relative to the smoothed luminance and generates corrected images by increasing or decreasing the luminance of the combined images by amounts corresponding to the calculated ratios. For example, in the case in which the average luminance is larger than the smoothed luminance and the difference therebetween is 20% of the smoothed luminance, a corrected image is generated by decreasing the luminance of the combined image by 20%. The luminance correcting portion 75 stores the generated corrected images in the memory 72.

Figure 2B:
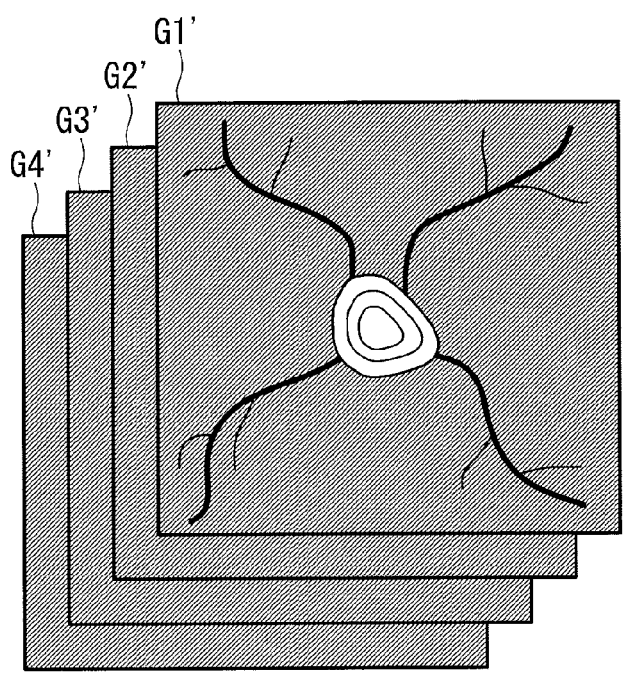
FIG. 2B is a diagram schematically showing corrected images generated by a luminance correcting portion.

As shown in (c) of FIG. 3, the differences between the average luminance and the smoothed luminance are correlated with the comparatively small fluctuations in the average luminance in the combined images. Specifically, in the combined images G1 to G4 for which the differences are large, the brightnesses thereof relative to the adjacent combined images in the Z-direction show comparatively large differences. These brightness differences create a stripe-patterned luminance irregularity in a three-dimensional image. Therefore, by correcting the average luminance of the combined images so as to be equal to the smoothed luminance by using the differences between the average luminance and the smoothed luminance, corrected images G1' to G4' in which the brightness smoothly fluctuates in the Z-direction are obtained, as shown in FIG. 2B.

The three-dimensional image generating portion 76 acquires the corrected images stored in the memory 72 and generates a three-dimensional image from the acquired corrected images. At this time, the noise removing portion 77 applies a noise removing filter to the individual corrected images before combining them into a three-dimensional image. The three-dimensional image generating portion 76 outputs the three-dimensional image, which is generated from the corrected images subjected to the noise removal, to the image displaying portion 8.

Here, a bilateral filter or the like is used as the noise removing filter. A bilateral filter is an image processing filter that blurs an image by assigning larger weights to pixels in which luminance differences relative to nearby pixels are small and by assigning smaller weights to pixels in which luminance differences relative to nearby pixels are large. With such a bilateral filter, outlines of fluorescent regions, serving as observation subjects, can be preserved clearly, while effectively removing noise, that is, minute luminance fluctuations.

Figure 4:
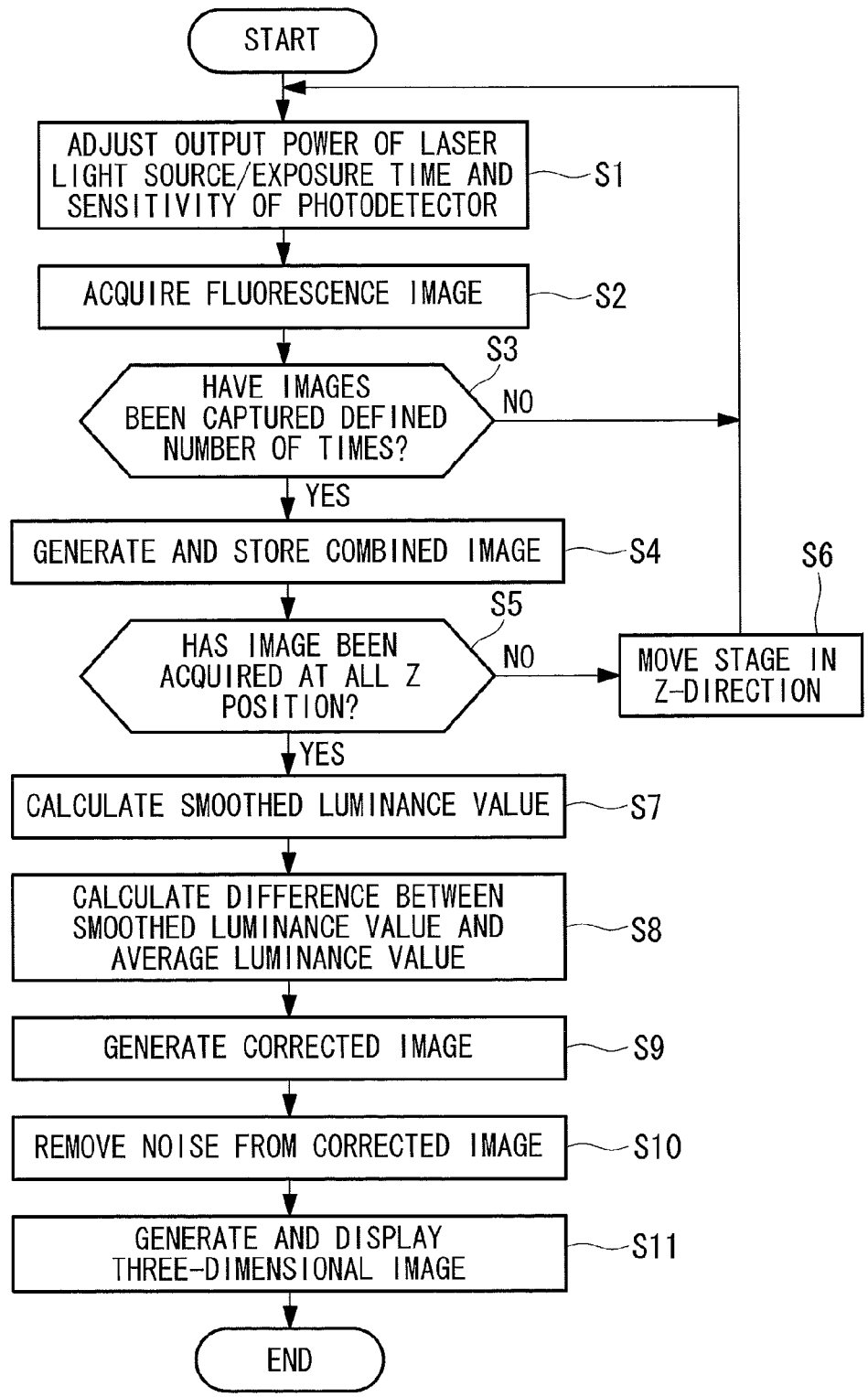
FIG. 4 is a flowchart showing the operation of the fluorescence microscope apparatus in FIG. 1.

Next, the operation of the thus-configured fluorescence microscope apparatus 1 will be described with reference to the flowchart in FIG. 4.

First, the fluorescence microscope apparatus 1 acquires a plurality of fluorescence images needed for generating combined images at a plurality of focal positions. Specifically, laser light emitted from the laser light source 2 is radiated onto a specimen A while the light is scanned two-dimensionally by the scanning optical unit 42. Fluorescent substances are excited at a focal position of the laser light in the specimen A, thus generating fluorescence. After being collected by the objective lens 46, the fluorescence passes through the scanning optical unit 42, is reflected by the dichroic mirror 41, and is detected by the photodetector 54 via the photometric filter unit 51, the lens 52, and the pinhole 53.

The fluorescence detected by the photodetector 54 is input to the image generating portion 71 of the image processing unit 7 after being photoelectrically converted. The image generating portion 71 generates a two-dimensional fluorescence image of the specimen A from the fluorescence intensity information input from the photodetector 54 and the positions where the laser light is scanned by the scanning optical unit 42, input from the control unit 6 (Step S2).

At this time, the fluorescence microscope apparatus 1 performs fluorescence-image acquisition a defined number of times (NO in Step S3) while changing at least one exposure condition among the output intensity of the laser light, the exposure time of the photodetector 54, and the detection sensitivity of the photodetector 54 by means of the control unit 6 (Step S1). By doing so, the defined number of fluorescence images with differing exposure levels are acquired at the same focal position. Subsequently, the image combining portion 73 generates a combined image from these fluorescence images and stores it in the memory 72 (Step S4).

After the acquisition of the defined number of fluorescence images and the combined image generation are completed (YES in Step S3), the fluorescence microscope apparatus 1 moves the stage 3 in the Z-direction by a predetermined distance by means of the control unit 6 (Step S6), and repeats Steps S1 to S4 at different focal positions. After the acquisition of fluorescence images is completed at all focal positions set in advance (YES in Step S5), the smoothed-luminance calculating portion 74 reads out the combined images from the memory 72, and calculates the smoothed luminance for the individual combined images (Step S7).

Subsequently, the luminance correcting portion 75 calculates the differences between the average luminance and the smoothed luminance for the individual combined images (Step S8) and generates corrected images by correcting the luminance of the combined images on the basis of the differences (Step S9). After the corrected images generated by the luminance correcting portion 75 are stored in the memory 72, the three-dimensional image generating portion 76 acquires the corrected images from the memory 72. Then, after the corrected images are subjected to the noise-removal processing by the noise removing portion 77 (Step S10), the three-dimensional image generating portion 76 generates a three-dimensional image from these corrected images and outputs it to the image displaying portion 8 (Step S11).

In this way, with the fluorescence microscope apparatus 1 according to this embodiment, changes in the luminance in the corrected images that form the three-dimensional image are smoothed in the Z-direction, which is the direction in which the corrected images are stacked. Therefore, there is an advantage in that it is possible to generate a three-dimensional image without stripe-patterned luminance irregularity.

Furthermore, it is also possible to obtain a three-dimensional image without luminance irregularity by making the widths of the dynamic ranges equal in all combined images when the image combining portion 73 generates the combined images. In that case, however, contrast is not optimized in the individual combined images, and the advantage of expanding the dynamic ranges is not fully utilized. In contrast, this embodiment affords an advantage in that, by smoothing the average luminance so that comparatively small fluctuations in the average luminance are removed while preserving comparatively large fluctuations, a conspicuous luminance irregularity can effectively be removed in a three-dimensional image while maintaining nearly optimal contrast in the individual combined images.

Although the relative positions of the stage 3 and the objective lens 46 are moved only in the Z-axis direction in this embodiment, alternatively, they may also be moved in the XY-directions. In this case, the stage 3 is configured to be movable in three axial directions, that is, the XYZ-directions, and the control unit (image-capturing position controller) 6 controls the movement of the stage 3 in the XY-directions.

Figure 5:
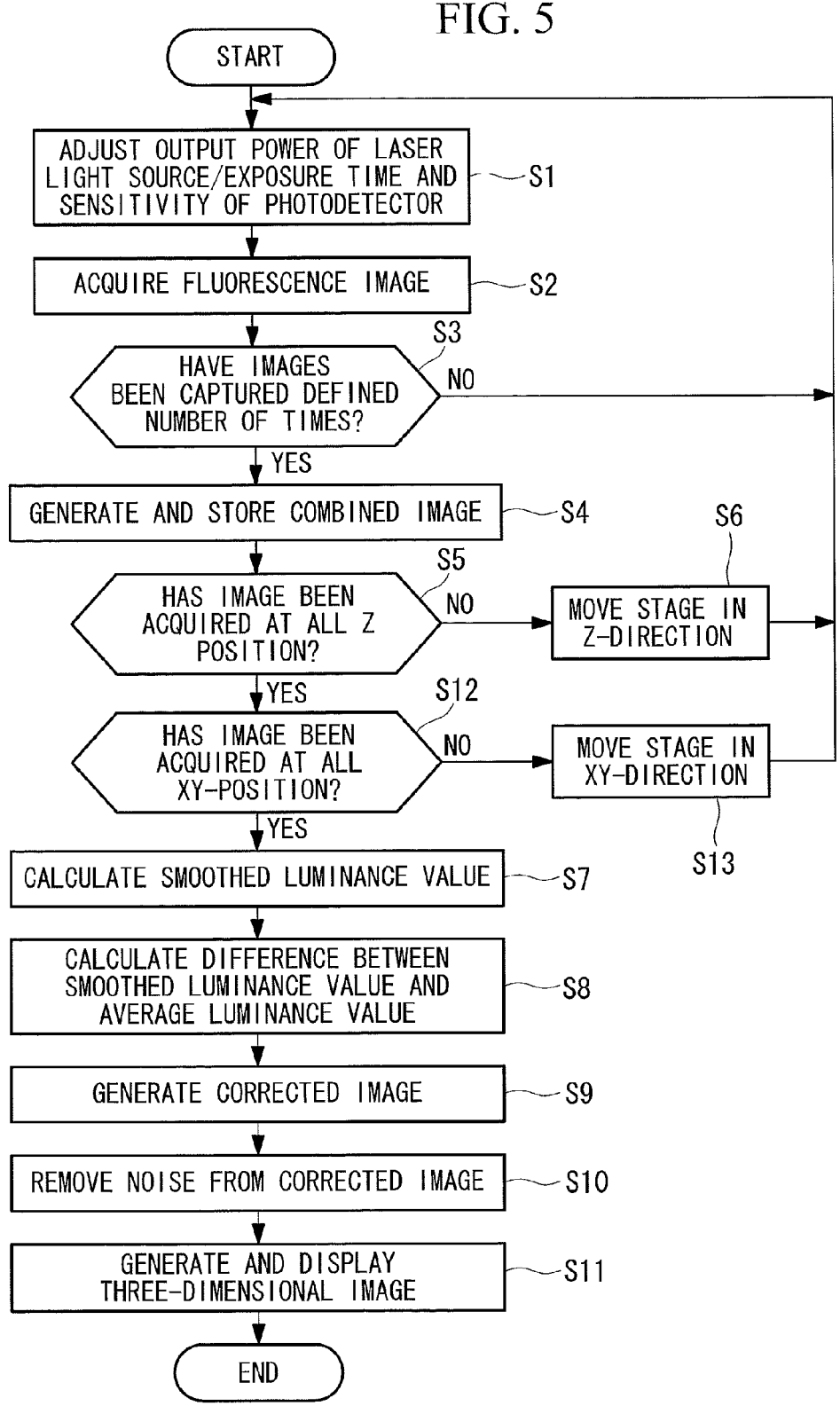
FIG. 5 is a flowchart showing the operation of a modification of the fluorescence microscope apparatus in FIG. 1.

The operation of a fluorescent microscope apparatus according to a thus-configured modification of this embodiment will be described with reference to the flowchart in FIG. 5.

For Steps S1 to S6, the fluorescence microscope apparatus according to this modification is operated similarly to the fluorescence microscope apparatus 1 described above. After the acquisition of the fluorescence images is completed at all focal positions at one XY-position, the control unit 6 moves the stage 3 in the XY-directions by predetermined distances (Step S13) and repeats Steps S1 to S6. Thereafter, the control unit 6 repeats moving of the stage 3 in the XY-directions and operations of Steps S1 to S6, and the process advances to Step S7 after the acquisition of the fluorescence images is completed at all set XY-positions (YES in Step S12). The operation of the fluorescence microscope apparatus after Step S7 is the same as that of the fluorescence microscope apparatus 1 described above. In this modification, a three-dimensional image is generated from all combined images having different XY-positions in Step S11 in which the three-dimensional image is generated.

In this way, with this modification, the image-capturing area is expanded not only in the Z-direction but also in the XY-directions, and thus, three-dimensional images of the specimen A can be obtained in a larger area.

In this modification, it is preferable that the control unit 6 set exposure conditions for the fluorescence images for each of the XY-positions.

Because the distribution of the specimen A and fluorescence intensity differ depending on the XY-positions, if the fluorescence images are acquired under the same exposure conditions at all XY-positions, variability in the luminance also occurs in the XY-directions in the combined images. Therefore, by adjusting the output power, etc. of the laser light source 2 so that fluorescence is captured at the individual XY-positions with substantially equivalent brightness, it is also possible to obtain a three-dimensional image in which the variability in luminance is reduced in the XY-directions.

In addition, although the configuration of a laser-scanning microscope is described in this embodiment as an example, the present invention can be employed in other types of microscope.

Figure 6:
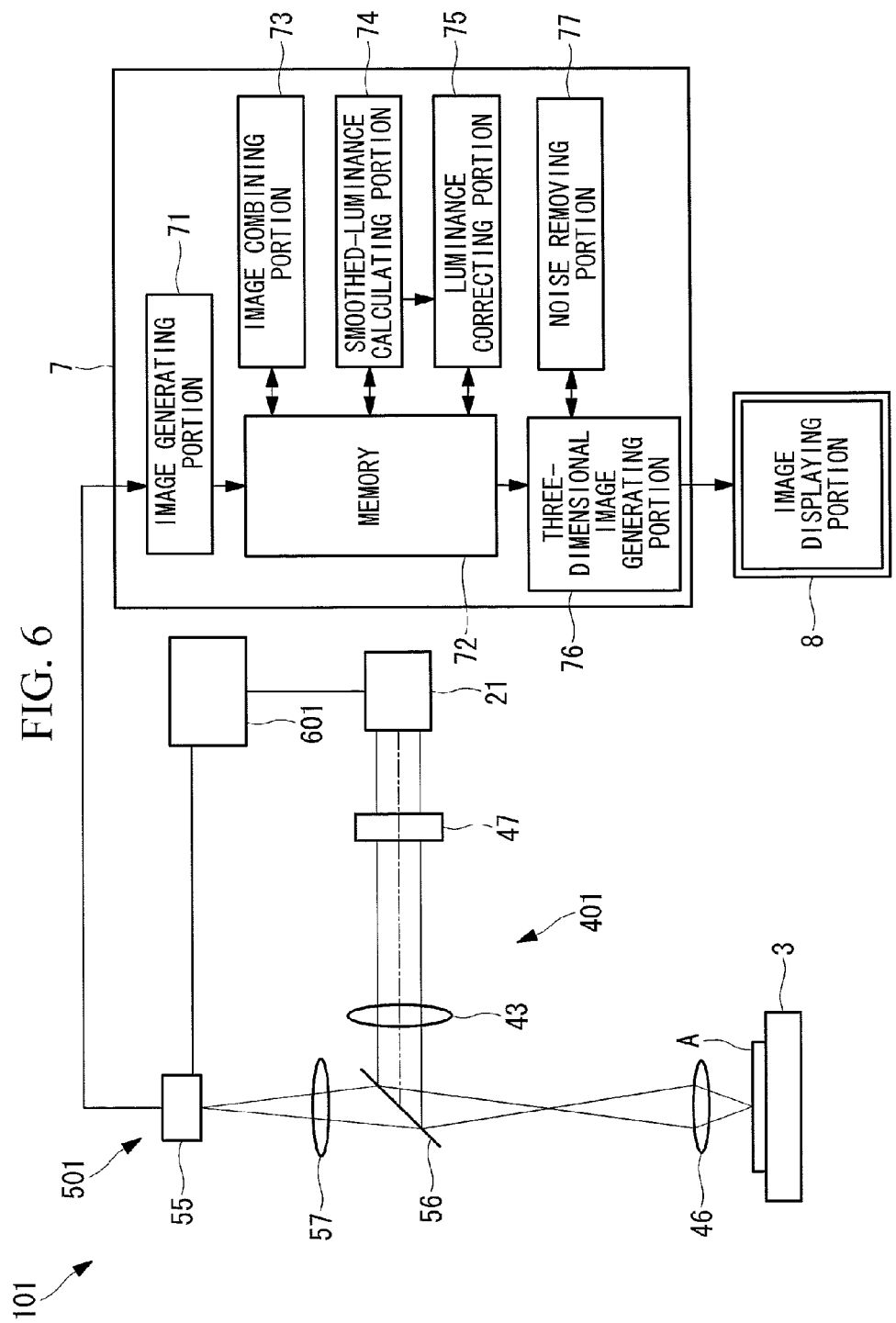
FIG. 6 is an overall configuration diagram showing a modification of the fluorescence microscope apparatus in FIG. 1, which is configured based on an epi-illumination fluorescence microscope.

As shown in FIG. 6, a fluorescence microscope apparatus 101 according to a modification of this embodiment is an epi-illumination or transmission fluorescence microscope (epi-illumination type in the illustrated example), and is provided with a white lamp (light source) 21, such as a mercury lamp, instead of the laser light source 2.

In this configuration, an illumination optical system 401 is provided with a rotating neutral density filter (rotating ND filter) 47 and the scanning optical unit 42 is omitted. A detection optical system 501 is provided with an image-capturing element 55, such as a CCD, instead of the photodetector 54; a dichroic mirror 56, instead of the mirror 44, which reflects light from the white lamp 21 along the optical axis of the objective lens 46, while allowing fluorescence coming from a specimen A to pass therethrough; and an imaging lens 57 that images the fluorescence, positioned between the dichroic mirror 56 and the image-capturing element 55.

The rotating ND filter 47 has a plurality of neutral density filters (not shown) and a rotating mechanism (not shown) that rotates the neutral density filters. By controlling the rotating mechanism so as to place a neutral density filter specified by the control unit 601 on the optical axis of the light emitted from the white lamp 21, the intensity of the laser light radiated onto the specimen A is adjusted, thus adjusting the exposure level of the fluorescence.

With the fluorescence microscope apparatus 101 according to this modification described above, the luminance irregularity in the Z-direction is removed similarly to the fluorescence microscope apparatus 1 described above, and it is possible to generate a three-dimensional image having even better fluorescence contrast.

Figure 7:
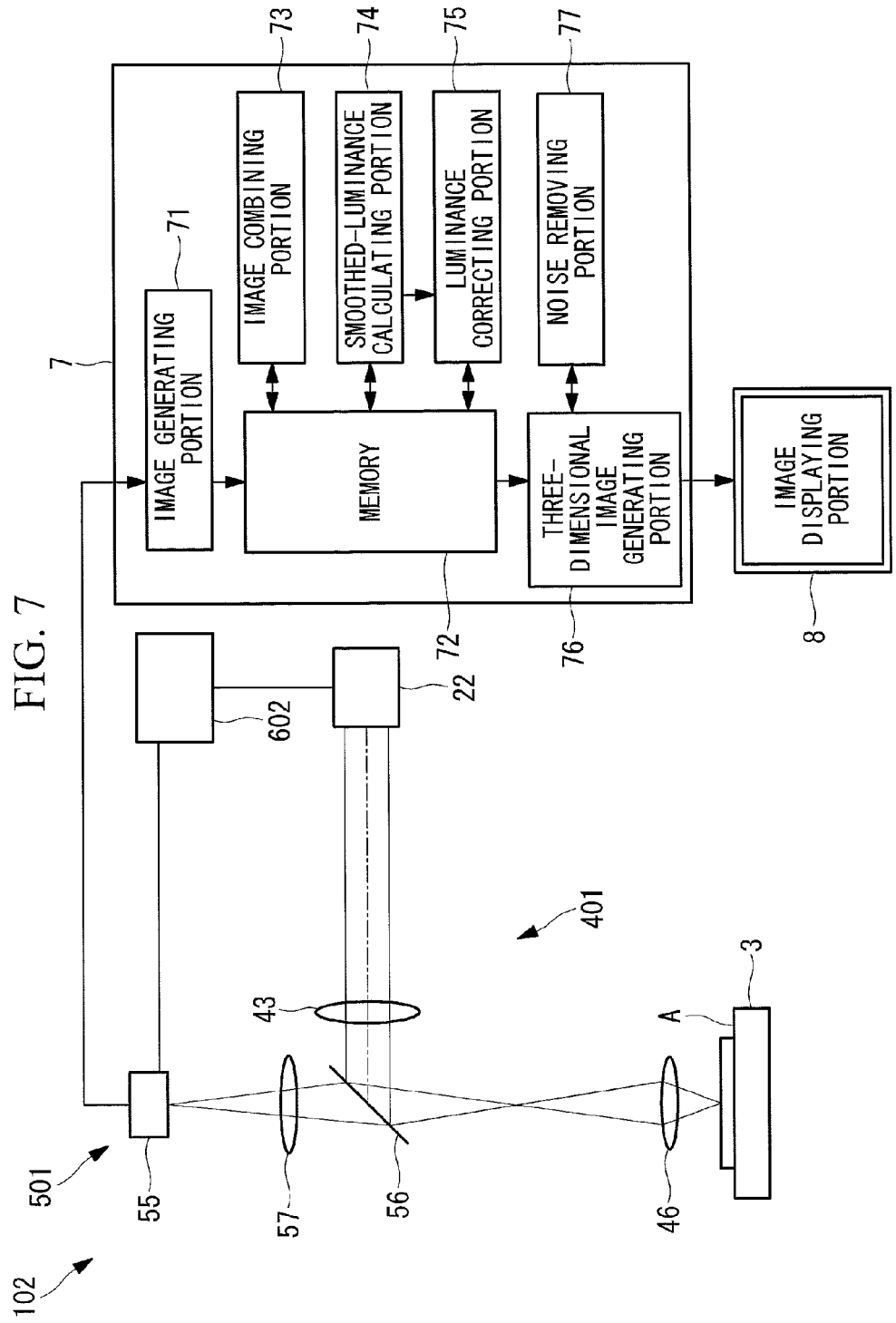
FIG. 7 is an overall configuration diagram showing a modification of the fluorescence microscope apparatus in FIG. 6 provided with an LED as a light source.

As shown in FIG. 7, this modification may be provided with an LED (light source) 22 instead of the white lamp 21. In a fluorescence microscope apparatus 102 having such a configuration, because exposure levels of fluorescence images can be controlled by controlling the output power of the LED 22 by means of a control unit 602, the rotating ND filter 47 may be omitted.

Figure 8:
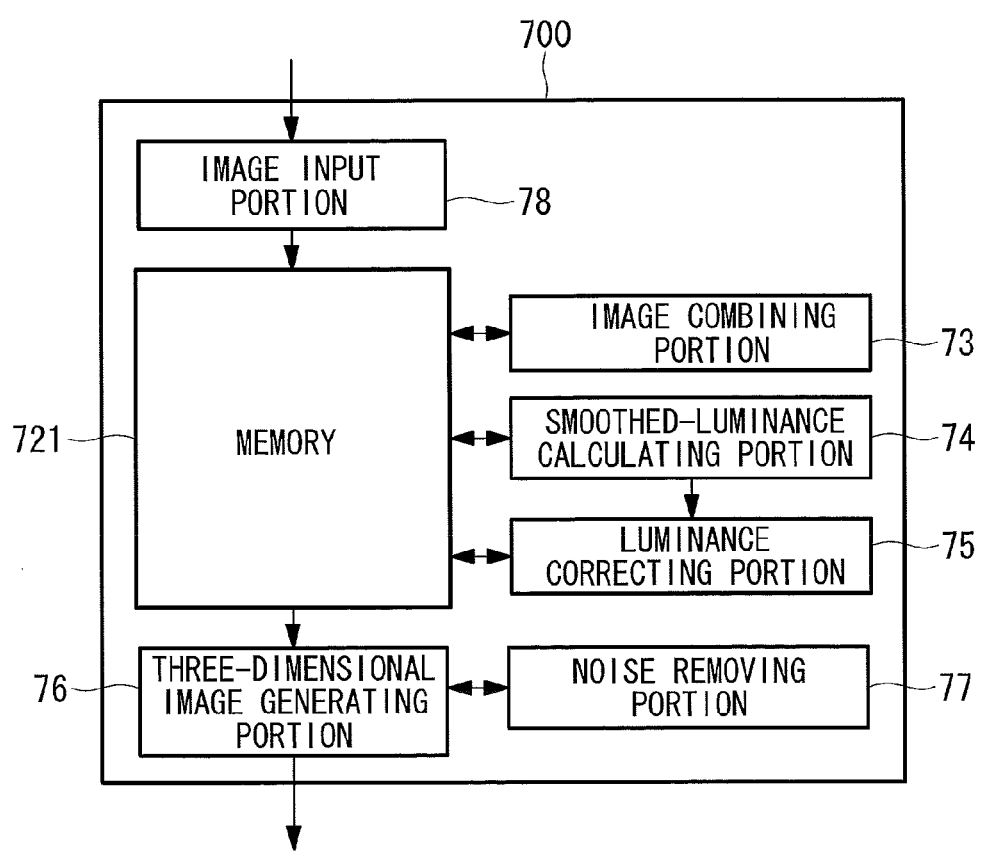
FIG. 8 is a block diagram showing the overall configuration of an independently-formed image processing apparatus.

In addition, although this embodiment has been described in terms of the configuration in which the image processing unit 7 is part of the fluorescence microscope apparatus 1, it is also possible to form the image processing unit 7 as an independent image processing apparatus. In this case, when a plurality of fluorescence images acquired by a separate fluorescence microscope apparatus at each of a plurality of focal positions with differing exposure levels are input to an image input portion 78 together with information indicating the focal positions for the individual fluorescence images, an image processing apparatus 700 stores these fluorescence images in a memory 721 in association with the information indicating the focal positions therefor, as shown in FIG. 8. As with the image processing unit 7 described above, the fluorescence images stored in the memory 721 are read out by the image combining portion 73, and combined images are generated.

In addition, although this embodiment has been described in terms of the configuration in which the image processing method is realized by hardware, the method may be realized by an image processing program that can be executed by a computer. In this case, the computer is provided with a CPU, a main storage device such as a RAM or the like, and a computer-readable storage medium. The computer-readable storage medium stores an image processing program for realizing at least the processing corresponding to Step S4, Steps S7 to S9, and Step S11 among the processing described above. Then, the CPU reads out the image processing program stored in the storage medium and executes the image processing and calculations, thereby realizing the same processing as that realized by the image processing apparatus described above.

The following aspects of invention are derived from the embodiment and modifications thereof described above.

A first aspect of the present invention is an image processing apparatus including an image combining portion that generates combined images by combining, for each depth position in a specimen, a plurality of fluorescence images captured with differing exposure levels at each depth position, which are fluorescence images generated by capturing fluorescence coming from the specimen at different depth positions in the specimen; a smoothed-luminance calculating portion that calculates a representative luminance from the individual combined images generated by the image combining portion and that calculates a smoothed luminance for the individual combined images by smoothing the calculated representative luminance in the depth direction; a luminance correcting portion that generates corrected images by correcting the luminance of the individual combined images on the basis of differences between the smoothed luminance and the representative luminance calculated by the smoothed-luminance calculating portion; and a three-dimensional image generating portion that generates a three-dimensional image of the specimen from the plurality of corrected images generated by the luminance correcting portion.

With the first aspect of the present invention, by combining the plurality of fluorescence images for the same depth positions with the differing exposure levels, the image combining portion generates combined images in which dynamic ranges are expanded with respect to the original fluorescence images. Then, the luminance correcting portion generates the corrected images by correcting the luminance of the combined images, and the three-dimensional image generating portion generates a three-dimensional image of the specimen from the corrected images.

In this case, the individual combined images have different dynamic ranges depending on the fluorescence intensities of the plurality of original fluorescence images. For the combined images whose dynamic ranges differ in this way, the smoothed-luminance calculating portion performs smoothing of the representative luminance in the depth direction of the specimen. Next, by correcting the luminance of the combined images on the basis of the differences between the smoothed luminance and the representative luminance of the individual combined images, the luminance correcting portion generates the corrected images in which the luminance smoothly changes in the depth direction of the specimen. By doing so, it is possible to generate a three-dimensional image from the corrected images without stripe-patterned luminance irregularity while achieving good contrast.

A second aspect of the present invention is a fluorescence microscope apparatus including a light source that radiates excitation light onto a specimen; an objective optical system that collects fluorescence generated at the specimen due to the irradiation with the excitation light; an image capturing portion that captures the fluorescence collected by the objective optical system; a focal-position controller that causes the image capturing portion to capture images of the specimen at a plurality of focal positions by moving the focal position of the objective optical system in the optical axis direction of the objective optical system; an exposure-level controller that causes the image capturing portion to capture the fluorescence multiple times at the individual focal positions with differing exposure levels; an image combining portion that generates combined images by combining the plurality of fluorescence images acquired by the image capturing portion at each focal position in accordance with the control by the focal-position controller and the exposure-level controller; a smoothed-luminance calculating portion that calculates a representative luminance from the individual combined images generated by the image combining portion and that calculates a smoothed luminance for the individual combined images by smoothing the calculated representative luminance in the optical axis direction; a luminance correcting portion that generates corrected images by correcting the luminance of the individual combined images on the basis of differences between the smoothed luminance and the representative luminance calculated by the smoothed-luminance calculating portion; and a three-dimensional image generating portion that generates a three-dimensional image of the specimen from the plurality of corrected images generated by the luminance correcting portion.

With the second aspect of the present invention, the image capturing portion captures the fluorescence generated at the specimen due to irradiation with the excitation light from the light source. At this time, the image capturing portion acquires the fluorescence images at the plurality of focal positions on the basis of the control by the focal-position controller, and, furthermore, the image capturing portion acquires the plurality of fluorescence images with differing exposure levels at the individual focal positions on the basis of the control by the exposure-level controller. By combining the plurality of fluorescence images from the individual focal positions, the image combining portion generates combined images whose dynamic ranges are expanded.

After the luminance correcting portion corrects the combined images so that luminance thereof smoothly changes in the depth direction of the specimen on the basis of the smoothed luminance calculated by the smoothed-luminance calculating portion, the combined images, in the form of the corrected images, are used by the three-dimensional image generating portion to generate a three-dimensional image. By doing so, it is possible to generate a three-dimensional image without stripe-patterned luminance irregularity while achieving good contrast.

In the second aspect described above, the exposure-level controller may control the exposure level of fluorescence by adjusting at least one of an intensity of the excitation light from the light source, a fluorescence detection sensitivity of the image capturing portion, and an exposure time of the image capturing portion.

By doing so, the exposure level of the fluorescence captured by the image capturing portion can be controlled in a simple manner.

In the second aspect described above, an image-capturing position controller may be provided, which, by moving relative positions of the specimen and the objective optical system in directions that intersect with the optical axis direction, causes the image capturing portion to acquire the plurality of fluorescence images with individually differing exposure levels at a plurality of adjacent positions in the intersecting directions at individual focal positions, wherein the exposure-level controller sets, for each of the individual positions in the intersecting directions, exposure conditions of the image capturing portion for the fluorescence.

By doing so, in the case of creating a three-dimensional image for a larger area, variability in the luminance can also be suppressed between the plurality of combined images that constitute the same plane by capturing the fluorescence at the plurality of positions in the same plane that intersects the optical axis.

A third aspect of the present invention is an image processing program that causes a computer to execute a step of generating combined images by combining, for each depth position in a specimen, a plurality of fluorescence images captured with differing exposure levels at each depth position, which are fluorescence images generated by capturing fluorescence coming from the specimen at different depth positions in the specimen; a step of calculating an average luminance from the individual generated combined images and of calculating a smoothed luminance for the individual combined images by smoothing the calculated average luminance in the depth direction; a step of generating corrected images by correcting the luminance of the individual combined images on the basis of differences between the calculated smoothed luminance and the average luminance; and a step of generating a three-dimensional image of the specimen from the plurality of generated corrected images.

{Reference Signs List}
1, 101, 102 fluorescence microscope apparatus
2 laser light source (light source)
6, 601 control unit (focal-position controller, exposure-level controller, image-capturing position controller)
8 image displaying portion
21 white lamp (light source)
22 LED (light source)
46 objective lens (objective optical system)
54 photodetector (image capturing portion)
73 image combining portion
74 smoothed-luminance calculating portion
75 luminance correcting portion
76 three-dimensional image generating portion
700 image processing apparatus
A specimen
G1 to G4 combined image
G1' to G4' corrected image

The invention claimed is:

1. An image processing apparatus comprising:
an image combining portion that generates a plurality of combined images, each of the plurality of combined images corresponding to one of a plurality of different depth positions in a specimen, by combining, for each of the depth positions, a plurality of fluorescence images captured with different exposure levels at the depth position, the plurality of fluorescence images being generated by capturing fluorescence coming from the specimen at each of the different depth positions;
a smoothed-luminance calculating portion that calculates a representative luminance for each of the plurality of combined images generated by the image combining portion and that calculates a smoothed luminance for each of the plurality of combined images by smoothing the calculated representative luminance along the depth direction;
a luminance correcting portion that generates a corrected image for each of the depth positions by correcting a luminance of a corresponding one of the plurality of combined images based on differences between the smoothed luminance and the representative luminance calculated by the smoothed-luminance calculating portion; and
a three-dimensional image generating portion that generates a three-dimensional image of the specimen from the corrected images each of which is generated for a respective one of the depth positions by the luminance correcting portion.

2. A fluorescence microscope apparatus comprising:
a light source that radiates excitation light onto a specimen;
an objective optical system that collects fluorescence generated at the specimen due to irradiation with the excitation light;
an image capturing portion that captures the fluorescence collected by the objective optical system;
a focal-position controller that causes the image capturing portion to capture images of the specimen at a plurality of focal positions by moving a focal position of the objective optical system in an optical axis direction of the objective optical system with respect to the specimen;

an exposure-level controller that causes the image capturing portion to capture the fluorescence multiple times at each of the plurality of focal positions with different exposure levels;

an image combining portion that generates a plurality of combined images, each of the plurality of combined images corresponding to one of the plurality of focal positions, by combining, for each of the plurality of focal positions, a plurality of fluorescence images having different exposure levels acquired by the image capturing portion at the focal position, in accordance with the control by the focal-position controller and the exposure-level controller;

a smoothed-luminance calculating portion that calculates a representative luminance for each of the plurality of combined images generated by the image combining portion and that calculates a smoothed luminance for each of the plurality of combined images by smoothing the calculated representative luminance along the optical axis direction;

a luminance correcting portion that generates a corrected image for each of the plurality of focal positions by correcting a luminance of a corresponding one of the plurality of combined images based on differences between the smoothed luminance and the representative luminance calculated by the smoothed-luminance calculating portion; and a three-dimensional image generating portion that generates a three-dimensional image of the specimen from the corrected images each of which is generated for a respective one of the plurality of focal position by the luminance correcting portion.

3. The fluorescence microscope apparatus according to claim 2, wherein the exposure-level controller controls the exposure level by adjusting at least one of an intensity of the excitation light from the light source, a fluorescence detection sensitivity of the image capturing portion, and an exposure time of the image capturing portion.

4. The fluorescence microscope apparatus according to claim 2, further comprising:

an image-capturing position controller that, by moving relative positions of the specimen and the objective optical system in directions that intersect with the optical axis direction, causes the image capturing portion to acquire the plurality of fluorescence images with different exposure levels at a plurality of adjacent positions in the intersecting directions at individual focal positions, wherein the exposure-level controller sets, for each of the plurality of adjacent positions in the intersecting directions, exposure conditions of the image capturing portion for the fluorescence.

5. A three-dimensional fluorescence image generating method for generating a three-dimensional image of a specimen from a plurality of fluorescence images acquired with varying exposure levels at each of a plurality of different depth positions of the specimen in an optical axis direction using a fluorescence microscope apparatus, the fluorescence microscope apparatus comprising a light source that radiates excitation light onto the specimen, an objective optical system that collects fluorescence generated from the specimen due to irradiation with the excitation light, a detector that detects the fluorescence collected by the objective optical system, and a focal-position moving mechanism that moves a focal position of the objective optical system in the optical axis direction of the objective optical system with respect to the specimen, and the three-dimensional fluorescence image generating method comprising:

generating a plurality of combined images each corresponding to a respective one of the different depth positions of the specimen by combining, for each of the depth positions, the plurality of fluorescence images acquired with different exposure levels at the depth position;

calculating an average luminance for each of the plurality of combined images generated and calculating a smoothed luminance for each of the plurality of combined images by smoothing the calculated average luminance along the optical axis direction;

generating a corrected image for each depth position by correcting a luminance of a corresponding one of the plurality of combined images based on differences between the calculated smoothed luminance and the calculated average luminance; and generating the three-dimensional image of the specimen from the corrected images each of which is generated for a respective one of the depth positions.

6. The three-dimensional fluorescence image generating method according to claim 5, wherein at least one of an intensity of the excitation light, a fluorescence detection sensitivity of the detector, and an exposure time of the detector is adjusted to vary the exposure levels.

7. The three-dimensional fluorescence image generating method according to claim 5, further comprising:

acquiring, by moving relative positions of the specimen and the objective optical system in directions that intersect with the optical axis direction, the plurality of fluorescence images with the different exposure levels at a plurality of adjacent positions in the intersecting directions, at the different depth positions, wherein variation in the exposure levels is performed to be set for each of the plurality of adjacent positions in the intersecting directions.

8. A fluorescence microscope apparatus comprising:

a light source that radiates excitation light onto a specimen;

an objective optical system that collects fluorescence generated at the specimen due to irradiation with the excitation light;

a detector that detects the fluorescence collected by the objective optical system;

a focal-position moving mechanism that moves a focal position of the objective optical system in an optical axis direction of the objective optical system with respect to the specimen;

a controller that controls at least one of the light source and the detector, and that controls the focal-position moving mechanism; and an image processing device that processes an image acquired based on a detection signal from the detector, wherein the controller is configured to perform:

a control in which a depth position at which an image acquisition is performed is varied in the optical axis direction by the focal-position moving mechanism, and a control in which an exposure level of fluorescence detected by the detector is varied by gradually increasing or decreasing at least one of an intensity of the excitation light, a fluorescence detection sensitivity of the detector, and an exposure time of the detector, and wherein the image processing device is configured to perform:

generating a plurality of combined images, each of the plurality of combined images corresponding to a respective one of a plurality of focal positions, by combining a plurality of fluorescence images with different exposure levels that are acquired at the respective one of the plurality of focal positions in accordance with the control by the controller;

calculating a representative luminance for each of the plurality of combined images generated and calculating a smoothed luminance for each of the plurality of combined images by smoothing the calculated representative luminance along the optical axis direction;

generating a corrected image for each of the plurality of focal positions by correcting the luminance of each of the plurality of combined images based on differences between the calculated smoothed luminance and the calculated representative luminance; and generating a three-dimensional image of the specimen from the corrected images each of which is generated for a respective one of the plurality of focal positions.

\* \* \* \* \*